A. H. CARRIER.
COMBINED SURFACE BREAKER AND CULTIVATOR.
APPLICATION FILED AUG. 29, 1918.

1,311,212.

Patented July 29, 1919.
3 SHEETS—SHEET 2.

Witness
C. D. Kesler
Chas. S. Hoyer

Inventor
Albert H. Carrier
By James L. Norris
Attorney

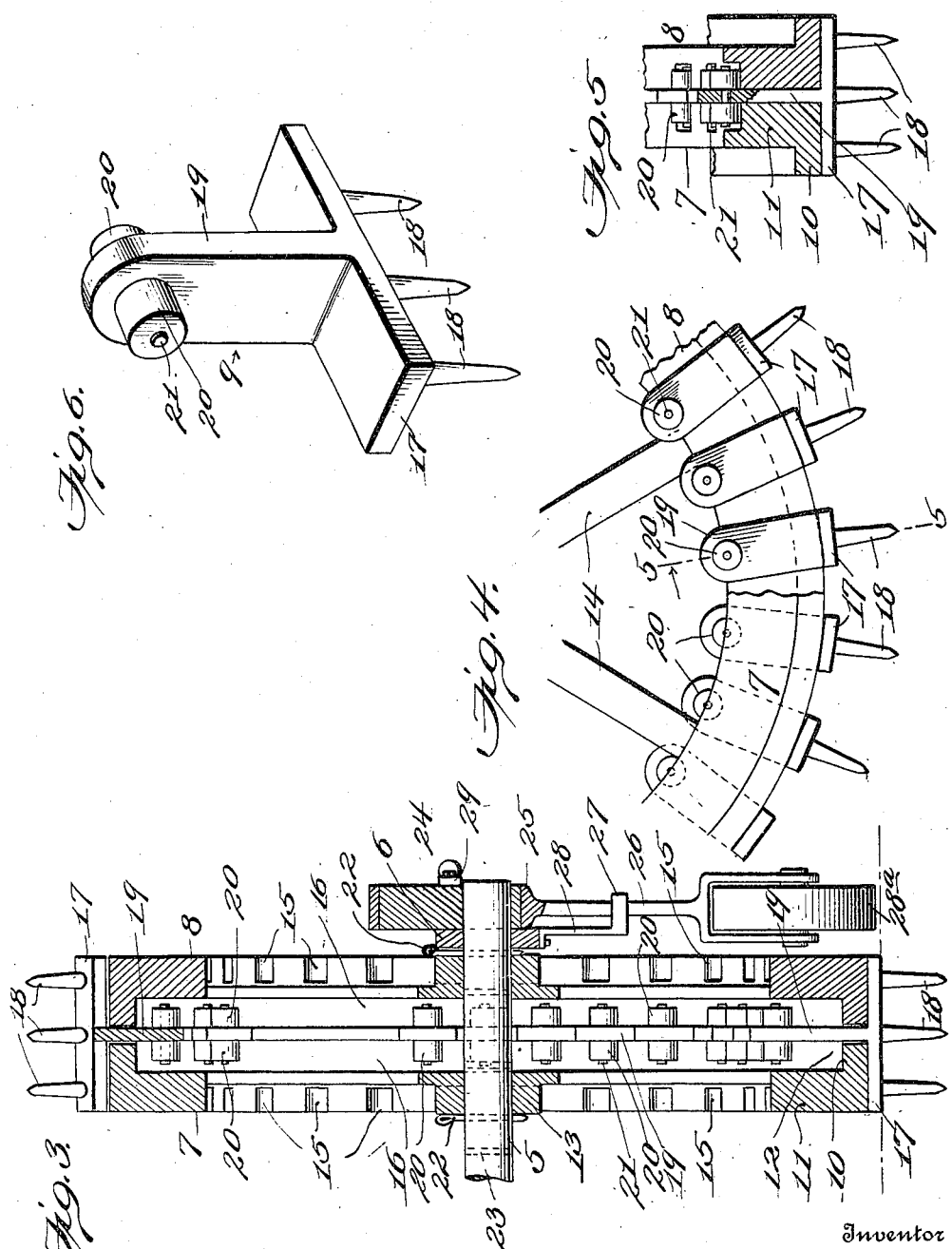

UNITED STATES PATENT OFFICE.

ALBERT H. CARRIER, OF ASHEVILLE, NORTH CAROLINA, ASSIGNOR OF ONE-HALF TO EDWIN W. GROVE, OF ST. LOUIS, MISSOURI.

COMBINED SURFACE-BREAKER AND CULTIVATOR.

1,311,212.

Specification of Letters Patent.   Patented July 29, 1919.

Application filed August 29, 1918.   Serial No. 251,963.

*To all whom it may concern:*

Be it known that I, ALBERT H. CARRIER, a citizen of the United States, residing at Asheville, in the county of Buncombe and State of North Carolina, have invented new and useful Improvements in Combined Surface-Breakers and Cultivators, of which the following is a specification.

This invention relates to a combined surface breaker and cultivator of the roller type, and the primary object of the invention is to provide means for puncturing a lawn or ground surface and also for breaking lumps or clods of earth without tearing up or gaping the sod or ground to facilitate seeding and restoration of sod and seeding rough ground where the use of a plow or other cultivating device is inexpedient, by producing openings for the reception of seed, and for retaining fertilizer and moisture. A further object of the invention is to provide convertible means equipped with devices that may be arranged for automatic movement into operative position, or be fixed to have a combined breaking and rolling crushing action, or wherein the said devices may be removed as an entirety to form a smooth roller.

With these and other objects and advantages in view, the invention consists in the construction and arrangement of the several parts which will be more fully hereinafter described and claimed.

In the drawings:

Fig. 3 is a transverse vertical section through the center of the breaker and cultivator as shown by Fig. 2.

Fig. 4 is a side elevation of a portion of the breaker and cultivator broken away and illustrating the puncturing devices in fixed position.

Fig. 5 is a transverse vertical section on the line 5—5, Fig. 4.

Fig. 6 is a detail perspective view of one of the puncturing devices.

Fig. 7 is an edge elevation, partly in section, showing the improved breaker and cultivator arranged as a roller with a smooth surface and having the puncturing devices removed therefrom.

Figure 1:
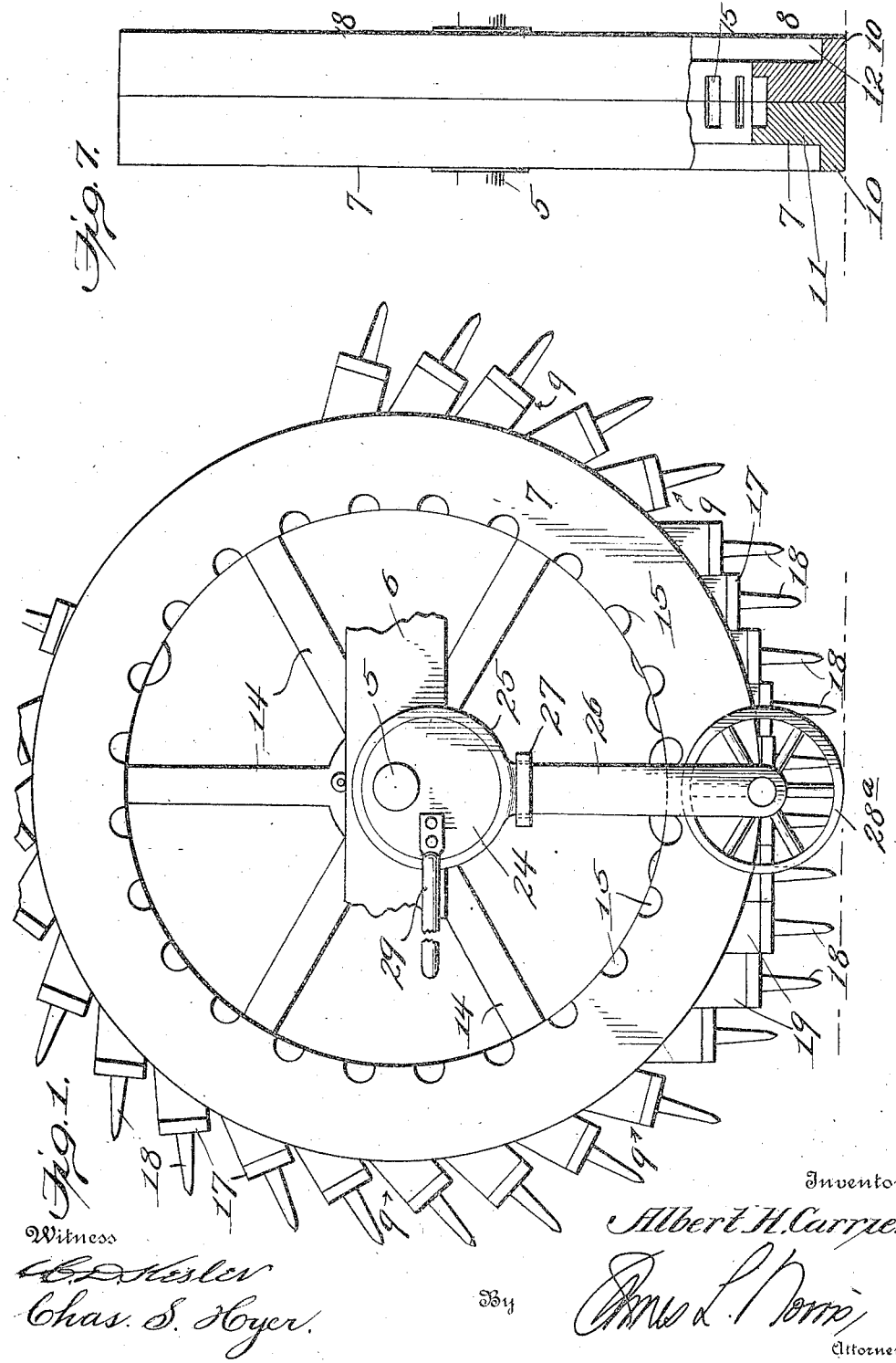
Figure 1 is a side elevation of a combined surface breaker and cultivator embodying the features of the invention and showing the puncturing devices elevated above the ground surface for purpose of transportation of the breaker and cultivator.
Figure 2:
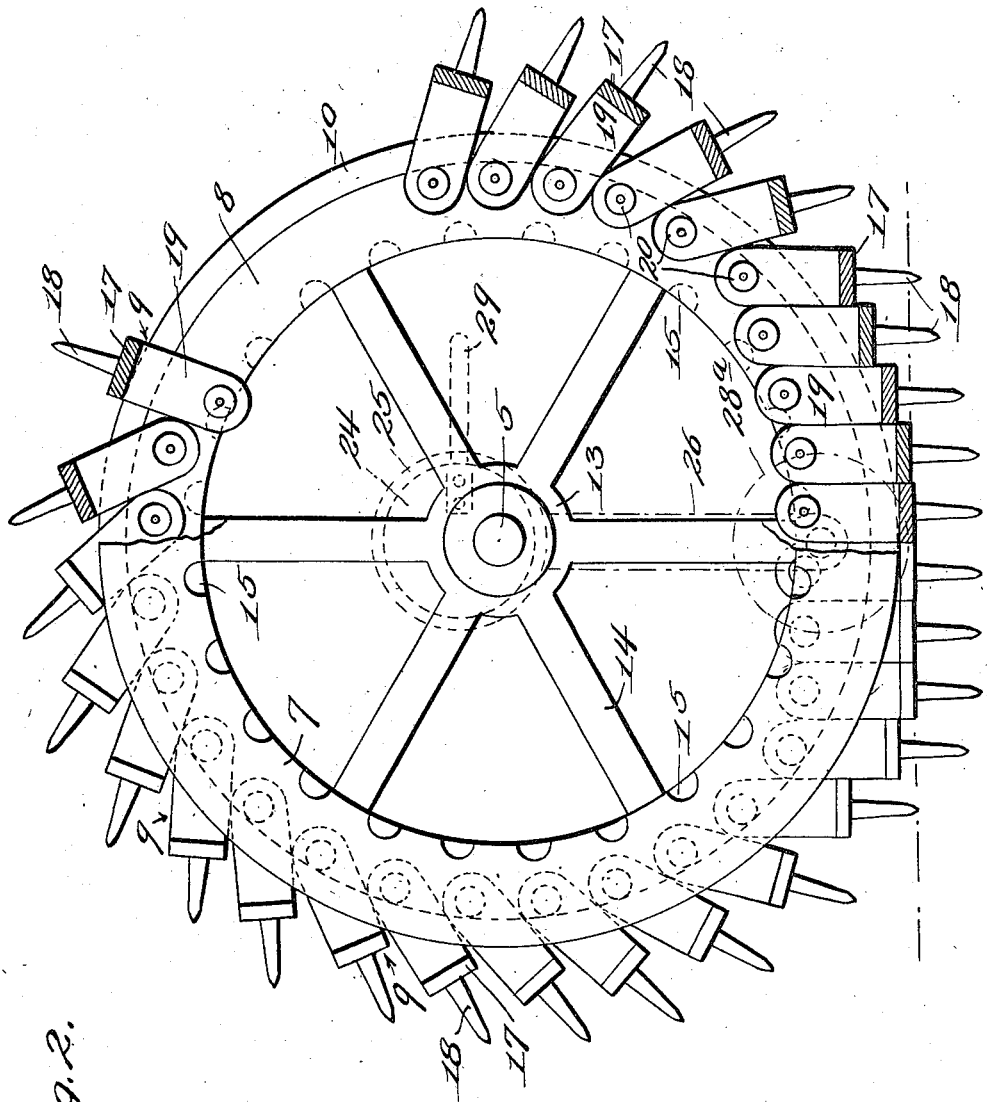
Fig. 2 is a side elevation of the combined breaker and cultivator partially broken away and in section and showing the puncturing devices in operative position and the manner in which they gravitate to the lower working portion of the breaker and cultivator.

The numeral 5 designates an axle which may be mounted in any suitable bearings, as for instance in side bars of a frame, one of these bars 6 being illustrated broken away in Fig. 1 and in section in Fig. 3. The length of the axle 5 will be determined by the number of the components of the breaker and cultivator hereinafter more fully explained, said components rotating on the axle or having a loose mounting relatively to the latter. The axle 5, as hereafter explained, will be provided with means for adjustment purposes, or to clear the working surfaces and puncturing devices of the breaker and cultivator from the ground surface during transportation from one place to another or during the time that it is undesirable to have the improved breaker and cultivator engage the ground surface. The improved breaker and cultivator aside from the axle 5 essentially comprises couples of wheel roller sections 7 and 8, there being as many of these couples used as found necessary, and it is intended that the complete breaker and cultivator when commercially introduced and vended will be furnished with a number of the said couples. Only two of the wheel roller sections are shown in each instance in the drawings to determine the practicability of the improved device. The further essential feature of the improved breaker and cultivator is a puncturing device 9, a number of the latter being provided and operating in either movable or fixed association with the couples of wheel roller sections. Each wheel roller section 7 or 8 has a peripheral flange 10 formed by shouldering the rim 11 of each wheel roller section, as at 12. Each wheel roller section also has a hub 13 and between the latter and the rim 11 are radial spokes 14. The inner edge of the rim 11 is clear between the spokes 14 and is provided with a plurality of seats or depressions 15. When the sections 7 and 8 are mounted in couples, as clearly shown by Fig. 3, an unobstructed space 16 is formed between them for the operation of the puncturing devices when the combined breaker and cultivator is arranged as shown by Figs. 1, 2 and 3, the formation of this space being due to the shouldered reduction of the rims 11 to produce the flanges 10. Each puncturing device comprises a flat head 17 having a plurality of teeth 18 projecting from the center of the outer side thereof to thereby provide a bearing or crushing surface on the head around the teeth, the head 17 having ample proportions to practically produce said bearing or crushing surface. Extending from the inner side of the center of the head 17 in planes at right angles to the latter is a shank 19 having adjacent to its free end oppositely disposed rollers 20 mounted on a suitable bearing stud 21 extending through the shank. When the improved breaker and cultivator is arranged for operation as shown by Figs. 1, 2 and 3, a suitable number of the puncturing devices 9 are introduced between the wheel roller sections 7 and 8 and are free to move and gravitate in the space 16 between said sections. In assembling the puncturing devices for free movement relatively to the sections 7 and 8, the shanks 19 are projected between the inner opposing ends of the flanges 10 which in this arrangement of the device are disposed as shown by Fig. 3, or both flanges projecting inwardly. To preserve the operative relationship and to prevent movement of the sections 7 and 8, the latter are held in fixed adjusted position on the axle by cotter pins 22, as clearly shown by Fig. 3, the axle being provided with a plurality of openings throughout its length to accommodate any adjustment of the sections that may be desired, as indicated at 23. In the arrangement shown by Figs. 1, 2 and 3, the rollers anti-frictionally engage the inwardly projecting flanges 10 of the sections 7 and 8 at intervals, and the rims 11 of these sections, including the flanges 10, roll upon the successive heads 17 of the puncturing devices on opposite sides of the shanks 19 so as to effect a penetration of the teeth 18 into the ground surface. As particularly shown by Fig. 2, a plurality of the puncturing devices gravitate toward the lower portions of the sections 7 and 8 adjacent to the ground surface, and the weight of the sections imposed on the heads 17 on opposite sides of the shanks 19 sets up a penetration of a sod surface or ground surface by causing the teeth 18 to sink into the ground, the heads 17 always resting upon the upper surface of the ground. The assemblage of the plurality of puncturing devices 9 at the lower or working portions of the sections 7 and 8 is effected solely by gravity, and when a number of the puncturing devices are so assembled they brace or reinforce each other and, owing to their loose mounting, the puncturing devices will cause the teeth 18 to enter the ground surface in a vertically straight direction and also effect a like upward drawing action of the teeth as the wheel roller sections progress, the puncturing devices gradually dropping into vertical position on one side of the vertical center of the wheel roller sections ready for entrance into the ground surface and at the opposite side of the vertical center gradually leaving the ground in vertical planes and thereby avoid tearing up or gaping the ground surface. In other words, the teeth 18 of the puncturing devices upon leaving the ground do not assume an angular position relatively to the ground surface until after the teeth of each puncturing device have been fully withdrawn from the ground surface. By this means the lawn or ground surface that may be acted upon by the improved device will be formed with a series of punctures or holes at regular intervals thereover to receive seed and fertilizer and will also be effective in retaining moisture with material advantages in general cultivation.

If it is desired to form a rolling toothed harrow device or to fix the puncturing devices to rotate regularly with the wheel roller sections 7 and 8, the latter sections are reversed on the axle 5, as shown particularly by Fig. 5, and in this arrangement the flanges 10 of both sections extend outwardly and the seats or recesses 15 which extend only partially through the inner portions of the rims 11 are brought together and the rollers 20 are caused to engage the seats, and after the sections 7 and 8 are secured against movement on the axle 5, the puncturing devices 9 will be held fixed and a spiked or toothed wheel will thereby be provided which will be found effective in certain cultivating operations, especially in breaking up clods or lumps or in otherwise preparing the ground for the reception of seed or other purposes.

The improved combined breaker and cultivator also is adapted to be arranged as a smooth roller, and to accomplish this conversion the puncturing devices 9 are all removed from the sections 7 and 8, the latter being retained in the positions similar to their association to secure the puncturing devices against movement, as clearly shown by Fig. 7. After the puncturing devices 9 have been removed, the sections 7 and 8 are moved in close contact and secured on the axle 5, thereby producing a roller having a smooth surface without teeth. The smooth roller may be extended as found necessary by adding to the sections on the axle or increasing the number of couples used.

It is obvious that some means should be provided for facilitating the transportation of the improved device in either of its toothed forms, especially to and from the lawn or ground surface to be operated upon, and to provide for this contingency each end of the axle will have thereon an eccentric 24, said eccentric being free to rotate on the axle and encircled by an eccentric strap 25 provided with a depending arm or bracket 26 movable in a guide 27 held by an arm 28 secured to the lower edge of the side or frame bar 6 and whereby the said arm or bracket 26 will be held in true vertical position. A ground roller 28ª is held by the lower end of the arm or bracket 26 to freely rotate, and to adjust the eccentric 24 a suitable lever or hand-bar 29 is provided which may be thrown down or elevated to lower the roller 28ª or elevate the same the proper distance to either engage the ground surface and raise the teeth 18 from contact with the said ground surface, or permit the teeth to be fully depressed into the ground surface. It will be understood that each extremity of the axle 5 will be provided with one of these attachments so that the device as a whole may be readily transported to and from the place of operation with the teeth 18 elevated to permit easy movement of the device and without in the least affecting the ground surface over which the combined breaker and cultivator may be transported.

It will also be understood that suitable draft devices or operating means will be provided for effecting a progressive movement of the combined breaker and cultivator in either of its forms, and when the teeth 18 are in position for operation either in their loose or fixed association relatively to the sections 7 and 8, the latter sections may be rolled either forwardly or rearwardly, or reverse movements may be imparted thereto at intervals as may be found necessary with the same operation of the teeth, and under the latter conditions the puncturing devices when loosely associated with the sections 7 and 8 will instantly assume practical working positions, as shown by Fig. 2.

It will also be understood that the teeth or spikes 18 may be of any length desired, and during dry weather the punctures produced by the teeth in treating lawns or in cultivating ordinary ground surfaces where other cultivating devices cannot be practically used would cause the roots of the sod for instance to be ventilated and go deeper to get moisture, thereby withstanding dry weather to better advantage, the weight of the device at the same time packing the ground or the sod over which it moves. Numerous other advantages will be apparent by the use of the improved combined breaker and cultivator, and it will be understood that the same may be made in various sizes and the puncturing devices relatively proportioned.

I claim as my invention:

1. In a device of the class specified, an axle, roller couples thereon having rims with peripheral flanges and with seats at the inner portions thereof, and puncturing devices having means to run loose and gravitate between the rims of the couples on the flanges and also adapted to be fixed in the said seats and held immovable between the rims.

2. In a device of the class specified, an axle, roller couples thereon having rims with a clear space between the same, and puncturing devices having teeth and means to engage and freely move in the said clear space between the rims.

3. A device of the class specified having an axle, roller couples thereon with rims, and puncturing devices having heads with teeth projecting therefrom upon which the rims have bearing and shanks with rollers supported to freely move between the said rims.

4. In a device of the class specified, an axle, roller couples thereon having rims with flanges projected from one side thereof and seats at the inner edges of the rims, the rims being reversible to dispose the flanges either inwardly or outwardly, and puncturing devices having teeth projecting beyond the rims of the couples and also provided with shanks having rollers movable between the rims on the flanges and also adapted to engage the said seats to hold the puncturing devices immovable between the rims.

5. In a device of the class specified, an axle, roller couples thereon having rims with peripheral flanges and with seats at the inner portions thereof, and puncturing devices having heads with teeth projecting therefrom and upon which the rims of the couples have bearing and also provided with shanks having rollers freely movable between the rims and also adapted to be placed in fixed engagement with the seats.

6. In a device of the class specified, an axle, roller couples thereon having rims, and puncturing devices having teeth projectable beyond the rims, the roller couples and puncturing devices having coöperating structures permitting the puncturing devices to have free gravitating movement between the rims and for securing the puncturing devices against movement between the rims.

7. In a device of the class specified, an axle, roller couples thereon having rims, puncturing devices having teeth projectable beyond the rims, the rims and puncturing devices having relative structures permitting the puncturing devices to freely move and gravitate between the rims and for securing the puncturing devices against movement between the rims, and means for elevating the roller couples, rims and teeth of the puncturing devices to clear the same from the ground surface.

8. In a device of the class specified, an axle, and roller couples reversibly mounted on the axle and having rims formed with shoulders to provide flanges at right angles to the main portions of the rims which serve as seats for holding puncturing devices in one adjustment of the couples and also to form an extended straight smooth rolling surface in another adjustment of the couples and when the said flanges are both projected outwardly in opposition to one another, and puncturing devices adapted to be applied to the said seats.

9. In a device of the class specified, an axle, roller means mounted on the axle, and a plurality of puncturing devices carried by the roller means, the roller means and puncturing devices having relatively coöperating means to permit the said devices to movably shift in the roller means and also for fixing the devices against movement in the roller means.

10. In a device of the class specified, an axle, roller couples thereon having rims, and puncturing devices having teeth which are projected beyond the rims, the roller couples and puncturing devices having coöperating structures permitting the puncturing devices to freely move around between and gravitate toward the lower ground surface-engaging portions of the rims, the teeth of the puncturing devices entering and leaving the ground in vertically straight portions to avoid tearing up and forming ragged cavities in the ground.

In testimony whereof I have hereunto set my hand in presence of two subscribing witnesses.

ALBERT H. CARRIER.

Witnesses:
R. S. SMITH,
J. C. DENISON.

Copies of this patent may be obtained for five cents each, by addressing the "Commissioner of Patents, Washington, D. C."